US011526752B2

(12) United States Patent
Zhao et al.

(10) Patent No.: US 11,526,752 B2
(45) Date of Patent: Dec. 13, 2022

(54) SYSTEMS AND METHODS FOR ACTIVE LEARNING

(71) Applicant: Google LLC, Mountain View, CA (US)

(72) Inventors: Qi Zhao, Santa Clara, CA (US); Abbas Kazerouni, Mountain View, CA (US); Sandeep Tata, San Francisco, CA (US); Jing Xie, San Jose, CA (US); Marc Najork, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 337 days.

(21) Appl. No.: 16/750,053

(22) Filed: Jan. 23, 2020

(65) Prior Publication Data

US 2020/0250527 A1 Aug. 6, 2020

Related U.S. Application Data

(60) Provisional application No. 62/801,030, filed on Feb. 4, 2019.

(51) Int. Cl.
*G06N 3/08* (2006.01)
*G06N 3/04* (2006.01)

(52) U.S. Cl.
CPC ............. *G06N 3/08* (2013.01); *G06N 3/0472* (2013.01)

(58) Field of Classification Search
CPC ........ G06N 3/08; G06N 3/0472; G06N 3/006; G06N 7/005; G06N 3/084
USPC ...................................... 341/50, 51
See application file for complete search history.

(56) References Cited

U.S. PATENT DOCUMENTS

| | | | |
|---|---|---|---|
| 10,902,302 B2* | 1/2021 | Fu | G06N 3/04 |
| 10,949,714 B2* | 3/2021 | Gur | G06V 10/454 |
| 2019/0325276 A1* | 10/2019 | Fu | G06N 3/063 |

OTHER PUBLICATIONS

Agarwal et al, "Template Trees: Extracting Actionable Information from Machine Generated Emails", 29th International Conference Database and Expert Systems Applications, Regensburg, Germany, Sep. 3-6, 2018, pp. 3-18.

Ambati et al, "Active Learning and Crowd-Sourcing for Machine Translation", International Conference on Language Resources and Evaluation, Valletta, Malta, May 17-23, 2010, 6 pages.

(Continued)

*Primary Examiner* — Jean B Jeanglaude
(74) *Attorney, Agent, or Firm* — Dority & Manning, P.A.

(57) ABSTRACT

Provided are computing systems and methods directed to active learning and may provide advantages or improvements to active learning applications for skewed data sets. A challenge in training and developing high-quality models for many supervised learning scenarios is obtaining labeled training examples. Provided are systems and methods for active learning on a training dataset that includes both labeled and unlabeled datapoints. In particular, the systems and methods described herein can select (e.g., at each of a number of iterations) a number of the unlabeled datapoints for which labels should be obtained to gain additional labeled datapoints on which to train a machine-learned model (e.g., machine-learned classifier model). Generally, provided are cost-effective methods and systems for selecting data to improve machine-learned models in applications such as the identification of content items in text, images, and/or audio.

20 Claims, 7 Drawing Sheets

(56) References Cited

OTHER PUBLICATIONS

Arora et al, "Estimating Annotation Cost for Active Learning in a Multi-Annotator Enviromnent", Active Learning for Natural Language Processing, Boulder Colorado, Jun. 2009, pp. 18-26.
Attenberg et al, "Why Label When You can Search? Alternatives to Active Learning tor Applying Human Resources to Build Classification Models Under Extreme Class Imbalance", 10 pages.
Balcan et al, "Margin Based Active Learning", Conference on Learning Theory, San Diego, California, Jun. 13-15, 2007, 16 pages.
Chapelle et al, "Semi-Supervised Learning", The MIT Press, 2006, 2 pages.
Dagan et al, "Committee-Based Sampling for Training Probabilistic Classifiers", In Proceedings of the Twelfth International Conference on Machine Learning, Jul. 1995, 8 pages.
Dasgupta et al, "Hierarchical Sampling for Active Learning", Conference on Machine Learning, Helsinki, Finland, Jul. 5-9, 2008, 8 pages.
Deng et al, "ImageNet: A Large-Scale Hierarchical Image Database", Conference on Computer Vision and Pattern Recognition, Miami, Florida, Jun. 20-25, 2009, 8 pages.
Di Castro et al, "Automated Extractions for Machine Generated Mail", The WEB Conference, Lyon, France, 23-27, 2018, 8 pages.
Donmez et al, "Dual Strategy Active Learning", Proceedings of the 18th European Conference on Machine Learning, 12 pages.
Donmez et al, "Efficiently Learning tire Accuracy of Labeling Sources for Selective Sampling", Conference on Knowledge Discovety and Data Mining, 9 pages.
Duchi et al, "Adaptive Subgradient Methods for Online Learning and Stochastic Optimization", Journal of Machine Learning Research, No. 12, 2011, 39 pages.
Eban et al, "Scalable Learning on Non-Decomposable Objectives", arXiv:1608v2, Mar. 1, 2017, 9 pages.
Freund et al, "Selective Sampling Using the Query by Committee Algorithm", Machine Learning, vol. 28, pp. 133-168.
Fu et al, "A Survey on Instance Selection for Active Learning", Knowledge and Information Systems, vol. 35, 2013, 249-283.
Guestrin et al., "Near-Optimal Sensor Placements in Gaussian Processes", $22^{nd}$ International Conference on Machine Learning, Aug. 7-11, 2005, Bonn Germany, 8 pages.
Haertel et al, "Return on Investment for Active Learning", In Proceedings of the Neural Information Processing Systems Workshop on Cost-Sensitive Learning, 8 pages.
Hoare, "Algorithm 65: find", Communications of the ACM, vol. 4, Issue 7, Jul. 1961, pp. 321-322.
Hu et al, "Active Learning with Partial Feedback", arXiv:1802v3, Sep. 28, 2018, 15 pages.
Huang el al., "Active Learning by Querying Informative and Representative Examples", Twenty-fourth Conference on Neural Information Processing Systems, Vancouver, Canada, Dec. 6-11, 2010, 9 pages.
Kajino et al., "Active Learning for Mulit-relational Data Construction", May 18-22, 2015, Florence, Italy, 28 pages.
Krause et al., "Nonmyopic Active Learning of Gaussian Processes: An Exloration-Exploitation Approach", The $24^{th}$ International Conference on Machine Learning, Jun. 20-24, 2007, Corvalis, Oregon, 25 pages.
LeCun et al., "Gradient-Based Learning Applied to Document Recognition", Proceedings of the IEEE, vol. 86, No. 11, Nov. 1998, 46 pages.
Lewis el al., "A Sequential Algorithm for Training Text Classifiers", International ACM SIGIR Conference on Research & Development in Information Retrieval, Jul. 3-6, 1994, Dublin, Ireland, 10 pages.
Lewis et al., "Heterogeneous Uncertainty Sampling for Supervised Learning", Eleventh International Conference on Machine Learning, Jul. 10-13, 1994, New Brunswick, NJ, 9 pages.
Lin et al., "Active Learning with Unbalanced Classes & Example-Generation Queries", Sixth AAAI Conference on Human Computation and Crowdsourcing, Jul. 5-8, 2018, Zurich, Switezerland, 10 pages.
Margineantu, "Active Cost-Sensitive Learning", Nineteenth International Joint Conference on Artificial Intelligence, Jul. 30-Aug. 5, 2005, Edinburgh, Scotland, 2 pages.
Moon et al., "Active Learning with Partially Featured Data", $23^{rd}$ International World Wide Web Conference, Apr. 7-11, 2014, Seoul, Korea, pp. 1143-1148.
Nguyen et al., "Active Learning Using Pre-Clustering", Twenty-First International Conference on Machine Learning, Jul. 4-8, 2004, Banff, Canada, 8 pages.
Ramirez-Loaiza et al., "Active Leanring: an Empirical Study of Common Baselines", Data Mining and Knowledge Discovery, vol. 31, 2017, 27 pages.
Schein et al., "Active learning for logistic regression: an evaluation", Machine Learning, vol. 68, No. 3, 2007, pp. 235-265.
Settles, "Active Learning", Carnegie Mellon University Machine Learning Department, Lecture, Nov. 14, 2012, 68 pages.
Seung et al., "Query by Committee", $5^{th}$ Annual Workshop on Computational Learning Theory, Jul. 27-29, 1992, Pittsburgh, PA, 8 pages.
Sheng et al., "Anatomy of a Privacy-Safe Large-Scale Information Extraction System Over email", ACM SIGKDD International Conference on Knowledge Discovery and Data Mining, Aug. 19-23, 2018, London, UK, 10 pages.
Sheng et al., "Get Another Label? Improving Data Quality and Data Mining Using Multiple, Noisy Labelers", ACM SIGKDD International Conference Knowledge Discovery and Data Mining, Aug. 24-27, 2008, Las Vegas, NV, 9 pages.
Snow et al., "Cheap and Fast—But is it Good? Evaluating Non-Expert Annotations for Natural Language Tasks", Conference on Empirical Methods in Natural Language Processing, Oct. 25-27, 2008, Honolulu, HI, 254-263.
Sorokin et al., "Utility data annotation with Amazon Mechanical Turk", 2008 IEEE Conference on Computer Vision and Pattern Recognition, Jun. 23-28, 2008, Anchorage, AK, 8 pages.
Su et al., "Crowdsourcing Annotations for Visual Object Detection", Human Computation Workshop (HCOMP), Jul. 23, 2012, Toronto, Canada, pp. 40-46.
Sutton et al., "Reinforcement Learning: An Introduction" Second Edition, MIT Press, Cambridge, Massachusetts, 548 pages.
Thrun, "Exploration in Active Learning", Handbook of Brain Science and Neural Networks, 1995, 10 pages.
Wallace et al., "Who Should Label What? Instance Allocation in Multiple Expert Active Learning", 2011 International Conference on Data Mining, Apr. 28-30, 2011, Mesa Arizona, 12 pages.
Welinder et al., "Online crowdsourcing: rating annotators and obtaining cost-effective labels", IEEE Computer Society Conference on Computer Vision and Pattern Recognition, Jun. 13-18, 2010, San Francisco, CA, 8 pages.
Welinder et al., "The Multidimensional Wisdom of Crowds", Twenty-Fourth Annual Conference on Neural Information Processing Systems, Dec. 6-9, 2010, Vancouver, Canada, 9 pages.
Xu et al., "Representative Sampling for Text Classifications Using Support Vector Machines", $25^{th}$ European Conference on IR Research, Apr. 14-16, 2003, Pisa, Italy, pp. 393-407.
Yang et al., "Leveraging Crowdsourcing Data For Deep Active Learning an Application: Learning Intents in Alexa", arXiv:1803.04223v1, Mar. 12, 2018, 10 pages.
Zhu, "Semi-Supervised Learning", Encyclopedia of Machine Learning, Springer, Boston, MA, 2011, 10 pages.

* cited by examiner

SYSTEMS AND METHODS FOR ACTIVE LEARNING

CROSS REFERENCE TO RELATED APPLICATIONS

The application claims the priority of U.S. provisional Patent Application No. 62/801,030, which has the filing date Feb. 4, 2019. The entire contents and substance of the aforementioned application are hereby incorporated by reference in their entirety.

FIELD

The present disclosure relates generally to active learning techniques, methods, and systems. More particularly, the present disclosure relates to active learning techniques which combine an exploration component and an exploitation component to allow for the intelligent selection of datapoints that improve supervised or semi-supervised learning models upon labeling.

BACKGROUND

A challenge in learning high-quality models in a variety of supervised learning scenarios is obtaining labeled training examples. Certain applications begin with a large number of unlabeled examples and need to acquire labels for training by presenting the examples to an expert (e.g., a human, who in some cases can have a skill or specific background) for judgment. This can be expensive in terms of time and human effort since it might require setting up tools and infrastructure, training the expert on the evaluation task, and paying for the time spent labeling the examples.

Algorithms that can intelligently select certain examples for labeling that are likely to provide a greater improvement to the supervised learning model are clearly valuable. This process can be referred to as "active learning." A beneficial active learning algorithm can obtain the same amount of improvement to a target metric for lower cost or obtain greater improvements at the same cost compared to a naive algorithm.

While active learning can be applied to a variety of data sets and data types, the technique can be more challenging when starting out with a limited amount of training data or when working with a skewed data set. Both cases can occur in various applications. As an example, consider building a spam model on an open discussion platform on the web. The data can be highly skewed, with most examples being non-spam. As another example, applications using active learning to improve the detection of sensitive or offensive content can encounter similar challenges—most data is in the negative class (non-offensive), with a small number of examples in the positive class.

A known active learning baseline is margin sampling. The intuition in margin sampling is to sample from unlabeled points with a probability inversely proportional to the margin (distance from the separating hypersurface). Empirical studies have shown this approach to be effective in a variety of applications. However, since margin sampling normally selects new points based on previously labeled points, the technique can result in the algorithm becoming stuck at an uncertain area of the entire input space resulting in the sampling leaving out certain unexplored areas, which can be highly problematic in skewed datasets such as those described above.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for performing active learning on a training dataset that comprises a plurality of unlabeled datapoints and a plurality of labeled datapoints. The method includes, for each of one or more training iterations: training, by one or more computing devices, a machine-learned classifier model using at least a portion of the plurality of labeled datapoints; determining, by the one or more computing devices, a confidence score for each unlabeled datapoint based at least in part on one or more confidence values output by the machine-learned classifier model; determining, by the one or more computing devices, an exploration score for each unlabeled datapoint; and for each of one or more label gathering slots: selecting, by the one or more computing devices and according to a probability parameter, an unlabeled datapoint for inclusion in one of the label gathering slots based on the confidence scores or based on the exploration scores; and obtaining, by the one or more computing devices, a respective label for each unlabeled datapoint included in the label gathering slots to transform the unlabeled datapoints included in the label gathering slots into labeled datapoints.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
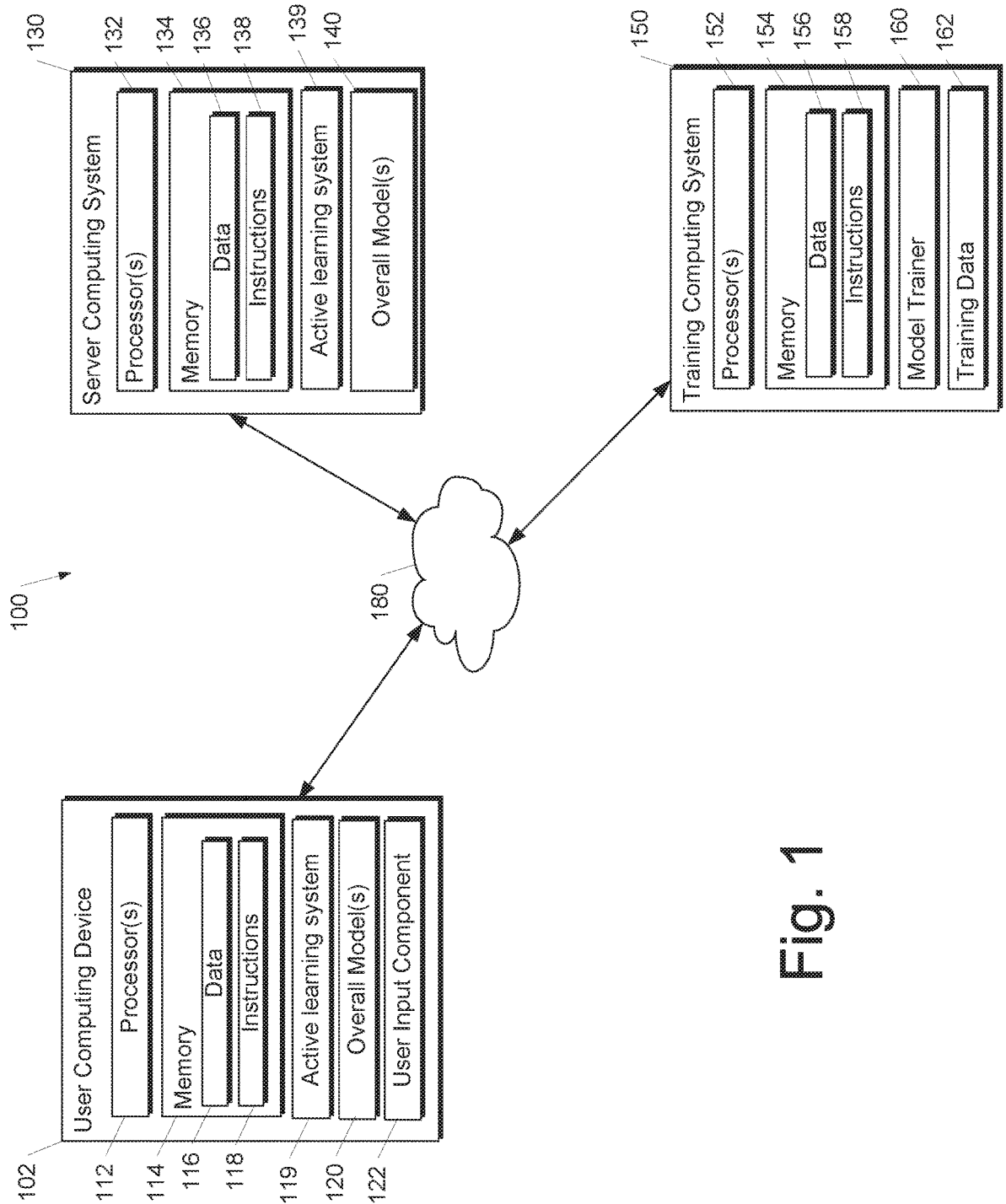
FIG. 1 depicts an example computing system running an example hybrid active learning model according to example embodiments of the present disclosure.

The present disclosure provides computing systems and methods directed to active learning and may provide advantages or improvements to active learning applications for skewed data sets. A challenge in training and developing high-quality models for many supervised learning scenarios is obtaining labeled training examples. This disclosure provides systems and methods for active learning on a training dataset that includes both labeled and unlabeled datapoints. In particular, the systems and methods described herein can select (e.g., at each of a number of iterations) a number of the unlabeled datapoints for which labels should be obtained to gain additional labeled datapoints on which to train a machine-learned model (e.g., machine-learned classifier model).

One example method includes selecting (e.g., at each iteration) between exploiting current knowledge about the training dataset or exploring within the training dataset. In particular, an example computing system can include an exploit component and an explore component. The exploit component can select unlabeled datapoints for labeling using confidence information obtained from the machine-learned model (e.g., classifier). For example, the confidence information can represent how well the labeled datapoints characterize the unlabeled data and the exploit component can seek to exploit the confidence information in a currently explored input space. The explore component, by contrast, can seek to explore unlabeled training examples outside of the currently explored input space.

According to an aspect of the present disclosure, both of the explore and exploit components can generate scores for assigning each of the unlabeled datapoints a label and a probability parameter can be used to decide whether to select an unlabeled datapoint based in part on the score generated by the explore component or the score generated by the exploit component. In certain implementations, this method can be applied iteratively to select unlabeled datapoints that can be assigned a label and update the training dataset. Thus, aspects of the present disclosure provide a method that can improve the supervised learning of the machine-learned model by intelligently selecting unlabeled datapoints for which a label should be assigned (e.g., by a human expert). In particular, the systems and methods described can provide active learning techniques to improve the performance of machine learning models at reduced costs. In some cases, labeling data can be expensive and/or time intensive and the examples and implementations described herein can provide a solution by intelligently selecting unlabeled datapoints to assign a label and training the machine learning model using the updated labeled datapoints that include the assigned labels.

In an example implementation, the systems and methods of the present disclosure can be iteratively applied to train a machine-learned classifier model using the labeled datapoints. The trained classifier can determine a confidence score for each of the unlabeled datapoints based in part on confidence values output by the trained classifier for assigning each unlabeled datapoint a classification label. The method can also determine an exploration score for each of the unlabeled datapoints. A second iterative process can be used to determine whether to select an unlabeled point based on the exploration score or an unlabeled point based on the confidence score. The selection can be determined using a probability parameter. The probability parameter can be adjusted in certain implementations. After selection, an unlabeled datapoint can be added to a label gathering slot on the basis of the confidence scores or the exploration scores until the label gathering slots meet a condition to satisfy the second iterative process. In some implementations, the unlabeled datapoints added to the label gathering slots can be assigned a label. Each of the unlabeled datapoints added to the label gathering slots can also be removed from the unlabeled datapoints in the dataset and each of the unlabeled datapoint assigned a label can be added to the labeled datapoints to update the training dataset. In some implementations, the method can continue to iterate using the updated training dataset.

To provide an example for the purpose of illustration, the active learning techniques proposed herein can be applied to a training dataset including spam email training examples and regular email training examples. The dataset can include emails, some having labels and others not having labels. A machine learning algorithm can use the dataset to generate a trained model, such as a trained classifier, that is configured to output a probability that the email is spam and a probability that the email is regular. These values can be used to determine a confidence score for each unlabeled email based in part on the output from the trained classifier. As an example, the probability each unlabeled email is spam and the probability each unlabeled email is regular can be determined by the trained classifier. In one example, the confidence score can be calculated based in part on the absolute value of the difference in the two probabilities for each unlabeled email. Low confidence score values would then indicate that the model is uncertain whether to label each email as spam or regular (i.e., the probabilities for assigning each label are close). Additionally, an exploration score can be determined for each unlabeled email. As examples, the exploration score can be determined by a random number generator, according to a Gaussian distance formulation, or according to a neighborhood ratio technique. A probability parameter (e.g., static, adaptive, or variable) can be used to select whether to choose an unlabeled email based on the confidence scores (e.g., the unlabeled email with minimum confidence score) or based on the exploration scores (e.g., the unlabeled email having the minimum exploration score) to include in a label gathering slot. The unlabeled emails included in the label gathering slots can then be assigned a label (e.g., spam or regular). For example, the unlabeled emails included in the label gathering slots can be provided to human reviewer(s) who supply a label. The dataset is updated to remove the unlabeled emails included in the label gathering slots from the unlabeled emails in the dataset. Additionally, the dataset can be updated to add the emails assigned a label to the labeled emails and the classifier can be retrained using the updated dataset. It will be appreciated that the classifier trained on the newly labeled data may be used to detect spam emails in incoming emails and to modify those emails (e.g. to add a spam label or a warning) or to redirect those emails to another location (such as a predetermined folder and/or to another email address).

In this example, two labels, spam and regular, were used; however, this does not preclude applying this method to datasets and classifiers that include more than two labels. Additionally, this use case was directed to email classification for the purpose of spam detection. Other types of email classification, such as bill reminders, events, or coupons could apply the same technique. In particular, this active learning method could be applied to many types of text or image classification problems.

In one example, the active learning method could be used to review images to detect the presence of predetermined objects or content. For example, the dataset may include medical data such as images, audio, biometric data (such as heart rate, galvanic response, etc.) that may or may not indicate the presence of a particular condition or disease. In another example, images, audio or text may be reviewed to determine if the images, audio or text include particular content (such as obscene content or content that represents a security or privacy risk). Models trained using the datasets processed according to the techniques described herein may automatically process content in response to detecting the presence of a property. For example, where obscene content is detected, the relevant portion of the image, audio or text may be automatically modified (e.g. blurred, beeped, redacted or the like). In another example, transaction information can be reviewed to determine if a purchase is fraudulent. Additionally, this technique could be used to develop datasets that include images or words that are difficult for a computer to distinguish, for instance by improving the image sets used by CAPTCHA programs. In another example, datasets may be processed to identify edge cases that may be useful for training of other models. For example, datasets comprising driving log data (such as videos, lidar, radar and the like obtained from vehicles) may be processed using the techniques described herein to identify unusual situations for subsequent training of models used for controlling autonomous vehicles or robots. As another example, datasets comprising commands from voice-activated digital assistants may be processed using techniques described herein to identify commands that were not correctly processed by the digital assistant and those commands used to further train models used by the digital assistant.

As discussed above, this method can be applied to different types of data. In these implementations, the datapoints (labeled and unlabeled) that make up the dataset can be described by a set of features (e.g., email could include the features: sender, date, subject, etc.). In some implementations, these features are translated from an initial data type to a feature vector of numbers. Generally, the feature vector is not constrained to have a specific number of features, and it is understood that the number of features could vary based on application. By transforming data into feature vectors, the data can be more readily processed by the computing systems that implement the methods described herein.

In some implementations, the exploration score can be determined by a random number generator. For example, a random number generator can be applied to determine an exploration score that is essentially random for each unlabeled datapoint. In this manner the unlabeled datapoint having an optimum exploration score is chosen by selecting a random unlabeled datapoint. In certain example implementations, the optimum exploration score may be the minimum exploration score (i.e., the lowest of all the determined exploration scores.) In another example implementation, determining the optimum exploration score can include selecting an unlabeled data point using a weighted probability based in part on the exploration scores. For example, the datapoint having the lowest exploration score may have a higher probability of being selected (e.g., 80%) compared to the datapoints having higher exploration scores (e.g., <50%). Additionally, the difference in exploration scores from the minimum exploration score could be used in some implementations to determine a linear or logarithmic probability distribution for determining the optimum exploration score. Thus the optimum exploration score does not imply or indicate that there exists only a single unlabeled data point having the optimum exploration score.

Alternatively or additionally, the exploration scores can be determined using information from the feature vectors that describe the dataset. For example, the exploration score can be determined for each unlabeled datapoint based at least in part on a respective distance between the unlabeled point and each of the labeled datapoints. In such cases, the distance between the unlabeled datapoint and the labeled datapoint can be calculated using a distance formula extrapolated to the number of dimensions defined by the number of features. In some implementations, this distance formula can be transformed by a weighting variable and/or a normalization factor. Thus in certain implementations, the exploration score can be determined as the sum of the normalized weighted distance between an unlabeled datapoint and a labeled datapoint for each labeled datapoint. In this manner, the unlabeled datapoint having an optimum exploration score can be chosen as the unlabeled datapoint that is furthest from the labeled datapoints.

Other methods for defining the exploration score can include assigning each unlabeled datapoint a neighborhood having a subset of the unlabeled datapoints and a subset of labeled datapoints. In some implementations, the neighborhood can be defined as including the datapoints within a radius from the unlabeled datapoint. In other implementations, the neighborhood can be defined based on the number of nearest datapoints. A ratio can be calculated from the number of labeled datapoints and the number of total datapoints included in the neighborhood (e.g., the number of labeled datapoints divided by the number of total datapoints) to determine the exploration score. In this manner, the unlabeled datapoint having an optimum exploration score can be chosen as the unlabeled datapoint having the least labeled datapoints in the neighborhood; or, using the ratio, the unlabeled datapoint having the minimum exploration score.

Thus, in some implementations, calculating the exploration score based on information from the feature vectors uses the proximity or distance of the unlabeled datapoint to one or more labeled datapoints as an approximation for how well the labeled datapoints characterize the unlabeled datapoint. In some implementations, determining the unlabeled datapoints that are less characterized by the labeled datapoints (e.g., unlabeled datapoint having greater distances or fewer labeled datapoints in a neighborhood) can be used as a basis for selecting the unlabeled datapoint having an optimum exploration score.

The method for performing active learning has particular, but not exclusive, benefit for datasets that are skewed. For example, the training dataset can include a first subset of training examples that exhibit the first property associated with the first label and a second subset of training examples that exhibit a second property associated with a second label. The machine-learned classifier model can be configured to determine whether an input example exhibits the first property associated with the first label. However, in some instances, the training dataset is skewed such that a number of training examples included in the first subset of training examples is less than a number of training examples included in the second subset of training examples. Skew can be present in datasets that have a non-uniform distribution over classes in the labeled training set.

For certain implementations, the exploit component of the method can use a machine learned model, such as a trained classifier, to determine a confidence value to describe the unlabeled datapoint. The result can be in the form of a scalar, a vector, a tensor, or a higher dimensional output. In some implementations, the confidence value can be used to determine a confidence score. As an example, the machine learned model can output a vector of probabilities associated with assigning the datapoint one or more labels, and a confidence score can be determined by calculating the absolute difference between the probabilities (e.g., the difference between the highest confidence value and the next-highest confidence value for a given datapoint). In this manner, the lower the confidence score, the more uncertain the model as to the label and so the optimum confidence score can be based in part on the lowest or minimum confidence score. In other implementations, the highest confidence value can be directly used as the confidence score.

Generally, various methods can be performed by the exploit component when selecting an unlabeled datapoint based on the confidence scores. As example, any active learning method or combinations of methods can be performed such as, as examples: margin sampling, query-by-committee, expected model change, expected error reducing, and variance reduction. Additionally, these active learning methods may be used alone, in combination, or may be changed for different iterations of the overall method.

In some implementations, the method for active learning can use a probability parameter to decide whether to select an unlabeled datapoint based on the exploration scores or the confidence scores. In certain implementations, this selection can occur before the determination of the optimum exploration score and the optimum confidence score, thus the method can provide different implementations that have reduced computing requirements by only performing necessary calculations. As an example, an example method for active learning can determine an exploration score for each of the unlabeled datapoints and a confidence score for each of the unlabeled datapoints. The method can then determine based on the probability parameter to select the optimum exploration score. Thus, at least for this iteration of the method, the optimum confidence score does not need to be determined.

Several non-limiting probability parameters or probability models can be used to implement the active learning methods described herein. Generally, the probability parameter can include a fixed variable, an adjustable variable, or an adaptive variable. As an example, a fixed variable can include a percentage that weights the model to prefer selecting an unlabeled datapoint based on the exploit component or the explore component. In one example, the percentage could be 30%, so that approximately 30% of the training iterations would select an unlabeled datapoint according to the confidence scores while 70% of iterations would select according to the exploration scores. As another example, an adjustable variable can include a variable that changes based on a condition, such as according to an iterative schedule. As one example, the adjustable variable could be a percentage that increases by 0.5% for each iteration the model goes through, such that the method explores more at earlier iterations and exploits more at later iterations. As another example, an adaptive variable could be designed to incorporate information from the confidence scores, the exploration scores, or combinations thereof. In this example, the adaptive variable could utilize information from a prior iteration to bias selecting an unlabeled datapoint having an exploration score or an unlabeled datapoint having a confidence score.

In an example implementation, a probability parameter having an adaptive variable can be determined as selecting an unlabeled datapoint having an exploration score based on an evaluation metric. Depending on the application, the performance of the classifier can be measured in terms of different metrics such as its accuracy, area under precision-recall curve and recall at a certain precision. Possible evaluation metrics can include the performance of the classifier model at the current iteration compared to the performance of the classifier model at the prior iteration. Different metrics that characterize classifier performance can be used, including population statistics such as the average, mode, minimum, maximum confidence scores. These are not meant to limit the scope of possible metrics, only to provide a general idea for evaluating the classifier performance. As one example implementation, the method could implement a probability parameter having an adaptive variable that selects an unlabeled datapoint having an optimum confidence score if the evaluation metric is improving. If the evaluation metric is not improving, then the probability parameter selects an unlabeled datapoint having an optimum exploration score.

As another example implementation, the method for performing active learning on a dataset that includes unlabeled datapoints and labeled datapoints can have an identifier group containing at least two labels: an x-label and a y-label. The identifier group contains possible labels that could be assigned to the unlabeled datapoints or that are assigned to the labeled datapoints. Generally, an x-label and a y-label are used here to denote placeholders for any identifier (e.g., the x-label could be spam and the y-label could be 'not spam'). In some implementations, additional labels can be used to expand the identifier group beyond binary classification (e.g., the x-label could be dog, the y-label could be cat, and the z-label could be bird). For these implementations, a machine learning model can be trained using the labeled datapoints; a confidence score for each of the unlabeled data can be determined based on confidence values output by the trained learning model (e.g., for one unlabeled datapoint the x-label is 25% and the y-label is 75%). An exploration score can also be determined for each unlabeled datapoint. A probability parameter can be used to select the unlabeled datapoint having an optimum confidence score or an unlabeled datapoint having an optimum exploration score, and the selected unlabeled datapoint can then be assigned a label from the identifier group (e.g., the x-label or the y-label). As described above, certain implementations of the method can include iterating the method to improve the machine learning model by selecting unlabeled datapoints that the classifier is more uncertain about labeling, based in part on the confidence values, to assign a label. The datapoints can be assigned a label and are then added to the labeled datapoints to retrain the machine learning model using the updated dataset.

As an example of technical effect and benefit, the active learning methods described can be applied to a variety of applications to improve machine learning models at reduced costs and higher performance. These benefits can be especially important for use cases where little is known about the dataset that the model is characterizing. The methods can use an adaptive variable to limit processing and streamline calculations by selecting unlabeled datapoints based on a probability parameter and then selecting the optimum unlabeled datapoint to improve the classifier performance. Thus, the implementations described can lead to lower labeling costs and/or faster model improvements which would reduce overall operation costs.

Thus, the present disclosure provides a novel active learning algorithm, which may be referred to as Hybrid Active Learning (HAL), that leverages an explore-exploit trade-off. One key insight is to combine exploit techniques such as, for example, margin sampling which is a strategy that exploits the existing labeled data for incremental improvements to the training data set, with an exploration scheme that allows the training process to improve the classifier quicker than with exploitation alone. Margin sampling selects new points based on previously labeled points which could potentially introduce bias to the training set. Furthermore, margin sampling may get stuck at a particular uncertain area of the whole input space and leave out other unexplored areas. By sampling from unexplored areas in the input space, the exploration scheme exposes new uncertain areas to the margin sampler and improves its usefulness.

The proposed algorithms allow for a generic exploration scheme to be combined with the exploitation scheme (e.g., margin sampling). Hence, the computational complexity of the proposed algorithms depends on the complexity of the exploration scheme. As will be presented further herein, very simple exploration schemes such as random and Gaussian exploration significantly improve over margin sampling. In particular, Appendix A, which is included as a portion of this disclosure, demonstrates through studies on real and synthetic data that example implementations of the proposed algorithms significantly outperform margin sampling in experimental settings with skewed data. The advantage is particularly large during the initial stages where there is much less training data.

2. Example Problem Formulation

As an example aspect of the disclosure, consider a classification problem where a feature vector $x \in \mathbb{R}^d$ is mapped to a label y in a finite set of possible labels $\{1, 2, \ldots, K\}$. An agent has access to a set of unlabeled data along with a set of labeled data based on which a supervised machine learning ("ML") model (e.g., classifier) can be trained. For this example, the agent's goal is to improve the classifier's performance on a target metric using a given labeling budget. For example, the agent could repeatedly select a subset of the unlabeled data set, obtain the corresponding labels, and retrain the ML model using the expanded labeled data. More formally, let $U_t = \{x_i\}_{i=1}^{u_t}$ denote the unlabeled data set at time step t and let $L_t = \{(x_i, y_i)\}_{i=1}^{l_t}$ denote the labeled data set at that time. Based on at least these two data sets, the agent may employ supervised or semi-supervised learning methods to train a ML model such as a classifier $C_t$ at time t. For a time step t, the agent can select a set $M_t$ consisting of m unlabeled datapoints in $U_t$ and query their labels to get a set of m labeled points $\overline{M}_t$. Then, the data sets at the next time step are $U_{t+1} = U_t - M_t$ and $L_{t+1} = L_t \cup \overline{M}_t$ and a new classifier $C_{t+1}$ can be trained on $L_{t+1}$. This process may be continued for a sequence of time steps $t = 0, 1, 2, \ldots, T$.

Generally, the information acquired by labeling the points $M_t$ can improve the performance of the ML model. Using this example problem formulation, one of the agent's goals can be to intelligently select the set of points to be labeled such that the ML model's performance improves most at a given labeling cost. Depending on the application, the performance of the ML model can be measured in terms of different metrics such as its accuracy, area under precision-recall curve and recall at a certain precision. In this example, it is assumed that there is no access to a validation set when the active learning algorithm is being deployed, and hence, the algorithm cannot depend on the feedback it receives by evaluating the ML model on the validation set.

Some additional assumptions can distinguish aspects of this present disclosure from the standard active learning problem. As an example, one assumption can be that the data set is skewed; that is, one or more classes are over- or under-represented. This can be common in many real-world applications like detecting sensitive content or spam and phishing attacks in online communities. With this assumption, additional effort can be required to ensure that the active learning algorithm adds sufficiently many datapoints from the minority classes to the training set. A second assumption can be that the agent starts with very few labeled datapoints (i.e., very small $L_0$). This can occur in the real-world application of building a new model from scratch. In some cases, the ML model can be extremely unreliable during the initial phases and the active learning algorithm cannot rely solely on the model's predictions. Thus embodiments of the disclosure can provide improvements or advantages to active learning problems that include aspects of one or both of these assumptions.

3. Example Algorithm

The following example describes an active learning algorithm suited for the problem described in Section 2. To address the challenges discussed there, the algorithm consists of two main components, called exploit and explore. By mixing between these two components, the algorithm can outperform margin sampling on data with highly imbalanced classes and/or with a very small initial training set.

3a. Algorithm Exploit Component

This component of the algorithm is based at least in part on the predictions of the current classifier. In other words, at time t, this component exploits $C_t$'s predictions on each of the unlabeled points when deciding about the set $M_t$. While there may be different ways to exploit the classifier's prediction, margin sampling was used in this example. At each time t, margin sampling selects points the label of which the classifier $C_t$ is most uncertain about. Specifically, classifier $C_t$ suggests a prediction vector $\pi_t(x) = (\pi_t^1(x), \pi_t^2(x), \ldots, \pi_t^K(x))$ for each unlabeled point $x \in U_t$ such that $\pi_t^k(x)$ denotes the probability of x being of class k. Given this, a certainty score can be defined for each point $x \in U_t$ as $$c_t(x) = |\pi_t^{(1)}(x) - \pi_t^{(2)}(x)|, \quad (1)$$

where $\pi_t^{(1)}(x)$ and $\pi_t^{(2)}(x)$ are the maximum and second maximum components of $\pi_t(x)$, respectively. The certainty score represents how certain the classifier $C_t$ is about x's label. When the classifier is certain about a point x to be of one of the possible classes, the certainty score in (1) is large. On the other hand, if the classifier is not confident about what label x should have the prediction probabilities are close together resulting in a small certainty score. Given the certainty scores for each unlabeled point, the margin sampler selects the points with lowest certainty score.

3b. Algorithm Explore Component

As mentioned in Section 2, the ML model can be unreliable during the initial phases when it has not yet been trained with enough datapoints. Therefore, solely relying on the exploit component may result in poor performance of the algorithm. In particular, the margin sampler picks the points close to the decision boundary and hence focuses on a limited area of the whole space.

To address this, the explore component can be designed to select points in the unexplored areas of the dataset, independent of the classifier's prediction. Specifically, at each time t, an exploration score $s_t(x)$ can be assigned to each unlabeled point $x \in U_t$ that measures how explored the area around x is. The explore component can decide to pick one or more unlabeled datapoint based in part on the exploration score. There can be multiple ways to assign exploration scores to unlabeled points. Three such schemes are provided as examples, though other possible exploration models can be used as described in Section 1.

As an example, random exploration selects the unlabeled points uniformly at random. This is equivalent to assigning random exploration score $s_t(x)$ to each point $x \in L_t$ at round t, or more formally, $$s_t^R(x) \sim \text{uniform}(0,1) \quad (2)$$

As an example, gaussian exploration, works by assigning the following score to each unlabeled point x at round t:

$$s_t^G(x) = \sum_{z \in L_t} \exp\left(-\frac{\|x-z\|_2}{\delta}\right) \quad (3)$$

Here, $\delta$ can serve as a free parameter of the Gaussian exploration scheme which governs the effect of a labeled point on the exploration score of the unlabeled points. The closer an unlabeled point x to a labeled point z, the larger the score. The score can provide a reasonable measurement of the certainty of the label for x under the assumption that the label (or function value in a general sense) changes smoothly in the feature space. This can be better understood by considering a simple case with two close-by points a and b where the label for a is known. Since b is close to a, it tends to have the same label as a due to space smoothness assumption. In this case, knowing b's label adds little information to the training data. As a result, it could be desired to select unlabeled datapoints having lower exploration scores for labeling.

As an example, another scheme could include a neighborhood scheme, which can identify a neighborhood around each unlabeled point and determine the exploration score to be the fraction of labeled points in that area. For example, the neighborhood for each point could be the set of the N closest points to it. Additionally, it is possible to define more sophisticated, perhaps dynamically changing, neighborhoods that could improve the exploration scores.

One consideration when designing the exploration scheme is its computational complexity. Since scores are being computed for each unlabeled points at every round, there should be a computationally easy way to update them. Otherwise, the algorithm can be prohibitively expensive.

3c. Example Hybrid Active Learning Algorithm

The example algorithm includes a parameter $p \in [0,1]$ which denotes the trade-off between the explore and exploit components. At each round t, the algorithm has a budget to select m points. Each point can be picked according to the exploit or explore component with probability p and 1-p, respectively. Once a point is selected, the exploration score can be updated for the remaining unlabeled points and this process repeated until all m points have been selected.

Implementations of the algorithm are referenced as Hybrid Active Learning (HAL). As used herein, HAL-R(p) and HAL-G(p) denote HAL with random and Gaussian exploration and with a trade-off parameter p. Note that HAL-R(1) is equivalent to margin sampling and HAL-R(0) is equivalent to random sampling.

Algorithm (I): Hybrid Active Learning (HAL)

Input: Initial sets $U_0$, $L_0$; labeling budget m; trade-off parameter p; exploration scheme s, exploitation scheme c
Initialize: $U = U_0$, $L = L_0$ and compute s(x) for $x \in U_o$
1.    for t = 0,1,2, ... do
2.        Update the classifier C based on U and L
3.        Compute the certainty scores $c(x) \forall x \in U$
4.        Let M = { }
5.        for i = 1,2, ... , m do
6.            Let z = $\begin{cases} \text{argmin} c(w) \text{ with probability p} \\ w \in U \\ \text{argmin} s(w) \text{ with probability } 1-p \\ w \in U \end{cases}$
7.            Remove z from U and add it to M
8.            Update s(x) for $x \in U$
8.        end for
9.        Get the labels for points in M producing $\overline{M}$
10.       Update $L \leftarrow L \cup \overline{M}$
11.   end for
12.   Update the classifier C based on U and L

4. Example Evaluation Using Algorithm

In this example, evaluation results are provided to demonstrate the performance of Algorithm I. Algorithm I is designed for a general classification problem. The present evaluation demonstrates results for the special case of binary classification with positive and negative class labels. The evaluation compares Algorithm I to baseline algorithms both on synthetic and real-world data sets. Both these cases represent a skewed binary data set where a fraction of datapoints are positively labeled. The scenario where the active learning process starts with zero labeled datapoints can be considered as a special case, where $L_0$ is empty. For this example, a neural network is used for the classifier. In each evaluation, the same neural network architecture was used: two hidden layers with 20 nodes on each layer. Each layer is fully connected and uses rectified linear units (ReLU). The network is set up to optimize the cross-entropy loss. Adagrad is used to train the network with stochastic gradient descent. The initial learning rate is set to 0.05. The architecture used was determined based in part on the performance of the testing data set. However, different neural network architectures can be applied to train on the labeled datapoints and these architectures can be based on other aspects of the dataset. The active learning algorithm selects 100 points from the unlabeled datapoints at each round. These selected datapoints are then labeled and added to the training set to update the classifier.

In each of the following scenarios, Algorithm (I) is evaluated both for random exploration and Gaussian exploration. For Gaussian exploration, the scaling factor $\delta$ is set to 10. In addition, Algorithm (I) is compared to margin sampling and random sampling as two baseline algorithms. Reported in the Appendix are two performance metrics for the classifiers trained at each time step—the area under the precision-recall curve (AUC-PR) and the recall at precision of 0.9. Recall at high precision can be a more useful metric in applications where the positive class is very rare, and the goal in applications like sensitive-content detection is to recover as many positives as possible at a high precision bar.

4a. Evaluation Using Synthetic Data

The synthetic data set consists of 10-dimensional datapoints which are generated as follows. First, 300 random points are generated in the 10-dimensional space by sampling from a centered multivariate normal distribution with independent components each having a variance of 8. These points are then considered as the centers of 300 clusters. Given a cluster center $c_i$, a number of random points is generated according to a multivariate normal distribution centered at $c_i$ with independent components each having a variance of 4 to form cluster i. Out of these 300 clusters, the points in 10 randomly selected clusters are labeled positive and the rest of the points are considered as negatives. Finally, positive points are downsampled such that only 0.5% of all the points are positively labeled. Aside from the unlabeled set $U_0$ which consists of $10^5$ such datapoints, validation set E of size $10^4$ was generated as a basis to evaluate the performance of different algorithms.

Figure 4:
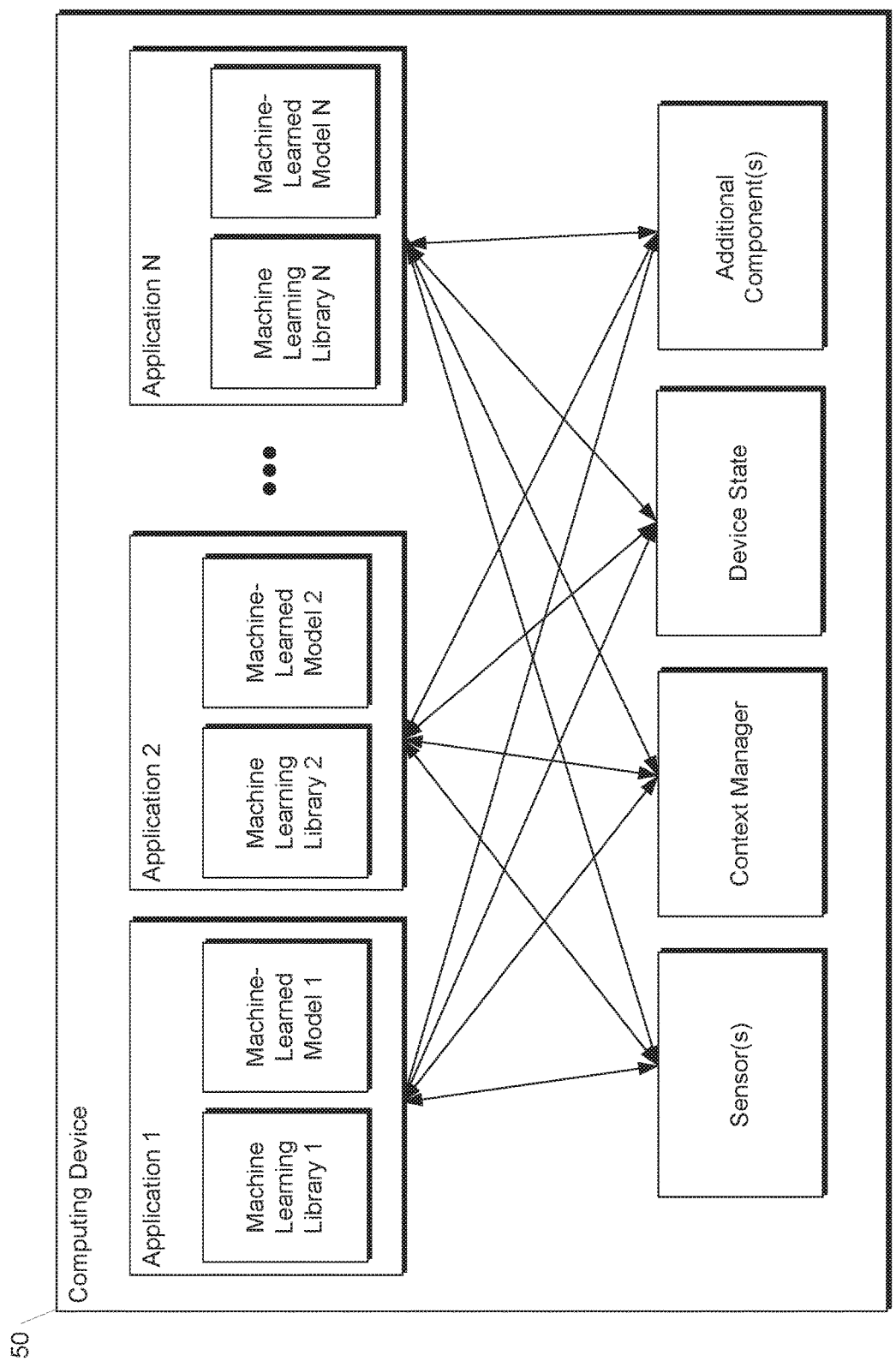
FIG. 4 depicts an example computing device for running example embodiments of the disclosure.
Figure 5:
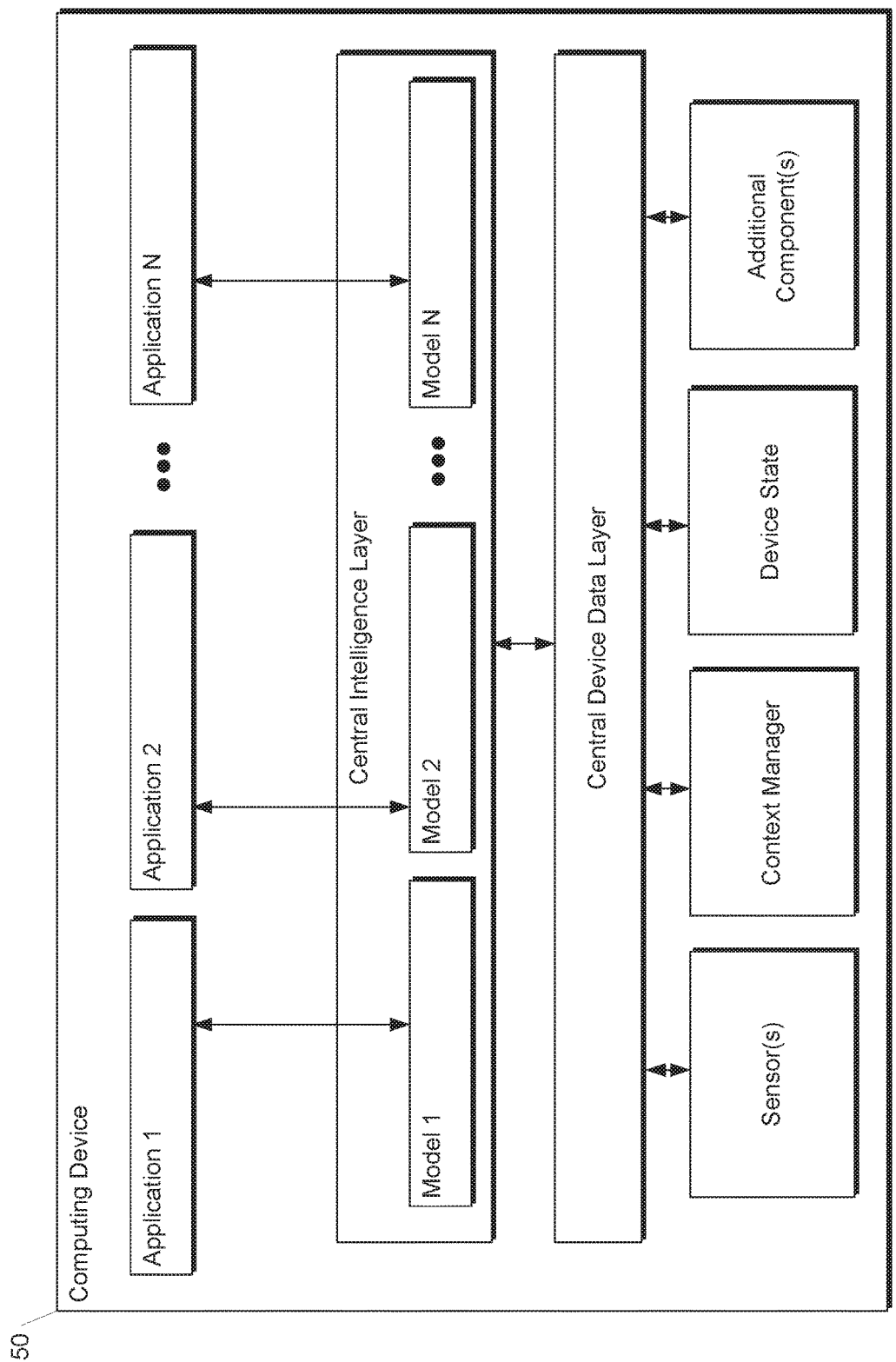
FIG. 5 depicts an example computing device for running example embodiments of the disclosure Reference numerals that are repeated across plural figures are intended to identify the same features in various implementations.

Results of evaluations using the synthetic data set are provided in FIGS. 4-6 of the Appendix. FIG. 4 depicts AUC-PR of different algorithms versus number of labeled points. Each curve is obtained by averaging the results of 100 repeated runs with the same parameters (e.g., the same exploration algorithm and trade-off parameter p). For each exploration scheme, the trade-off parameter p was varied from 0 to 1.0 with step 0.1 and taking the best performing fraction for comparison.

The evaluation results demonstrate that HAL-R(0.2) and HAL-R(0.8) both perform well under this metric. As can be seen in this figure, HAL-G(0.5) shows the best performance. FIG. 5 plots recall at precision 0.9 achieved by different algorithms. As depicted in this figure, HAL-G outperforms HAL-R. Also HAL-R(0.8) outperformed HAL-R(0.2), though these two algorithms have similar performance under the AUC-PR metric. Both FIGS. 4 and 5 indicate that HAL (both for random or Gaussian exploration) with p chosen to balance exploration and exploitation significantly improves over HAL-R(0), the plain margin sampling algorithm. FIG. 6 explores this further, by plotting the recall at precision 0.9 achieved by HAL-R for different values of the trade-off parameter p after observing 6,000 labeled datapoints. As depicted in this figure, a balanced trade-off between explore and exploit components performs much better than each component separately.

4b. Evaluation Using Real-World MNIST Data

To verify the above observations on real-world data sets, the evaluations were applied to a modified MNIST data set. The MNIST data set was assigned binary labels as follows: the digits 0, 1 and 4 were labeled as positive and the other 7 digits as negatives. Positive points are then downsampled to establish a 1.5%-skewed data set. The initial unlabeled set and the validation set consist of 77,000 and 14,000 datapoints, respectively.

Results of evaluations using the MNIST data set are provided in FIGS. 7-9 of the Appendix. FIGS. 7-9 show the performance of different active learning algorithms on the modified MNIST data set. According to these results, Algorithm (I) has a clear advantage over margin sampling in recall at high precision. Compared to the synthetic scenario, HAL-R and HAL-G perform more similarly, with Gaussian exploration doing marginally better. As in the previous case, the effect of the trade-off parameter p on the performance of Algorithm (I) is shown in FIG. 9. This figure plots the recall at precision 0.8 achieved by HAL-R after observing 6,000 labeled datapoints for different values of the trade-off parameter.

5. Evaluation Using an Adaptive Trade-Off Parameter

As shown in FIGS. 6 and 9 of the Appendix, the trade-off parameter can impact the performance of the proposed algorithm. Alternative implementations of Algorithm (I) could utilize a trade-off parameter p that can be varied at each step to change the explore vs. exploit trade-off as the classifier improves.

As an example implementation using an adaptive trade-off parameter, an adaptive algorithm can be developed that in certain implementations can be based on the existence of validation set. The algorithm alternates between HAL-G(0) (pure Gaussian exploration) and HAL-G(1) (pure margin sampling) based on the performance of the current sampling strategy. More formally, let HAL-G($p_t$), $p_t \in \{0,1\}$ denote the sampling strategy at time t. In this example, the initial strategy is set as $p_o = 0$ (pure Gaussian exploration). At each step t, after executing HAL-G($p_t$), the training data and model were updated to evaluate the new model on the validation set. Let $e_t$ be the evaluation metric at step t (AUC-PR used in the experiment), and $$\Delta_t = \frac{e_t}{e_{t-1}} - 1$$

be the performance improvement at t. In this case, $p_{t+1}$ is updated according to the following, $$p_{t+1} = \begin{cases} p_t & \text{if } \Delta_t \geq (1+\tau)\Delta_{t-1} \\ 1 - p_t & \text{otherwise} \end{cases} \quad (4)$$

where $\tau$, being 0.1 in the experiment, is a predefined threshold.

Compared to Algorithm (I) which uses a fixed p to choose the sampling strategy in a probabilistic manner, this simple adaptive algorithm chooses the strategy based in part on whether there is room for the current sampling strategy to improve the classifier. As the frequency of switching the sampling strategy is purely driven by the evaluation metrics, it is equivalent to changing p dynamically in the course of active learning. Results of evaluations using the adaptive trade-off parameter are provided in FIG. 10 of the Appendix. As shown in FIG. 10, this adaptive algorithm shows superior results on the MNIST data set, while it does not show any clear advantage on the synthetic data set suggesting that adaptive algorithms could provide further improvements to certain active learning problems.

Alternative methods for determining the performance may not require the presence of a validation set. For example, the evaluation metric could use information from the confidence values to determine whether to switch between the exploit or the explore approach. Such information could include a differential or incremental change in the confidence values over one or more iterations of the active learning algorithm. In an implementation, determining that the confidence values are changing by a certain threshold (e.g., 25% for a portion of the unlabeled datapoints) could indicate that the current strategy is improving the classifier, reducing the likelihood or probability that the evaluation metric would switch approaches.

Example Devices and Systems

FIG. 1 depicts a block diagram of an example computing system 100 that performs hybrid active learning according to example embodiments of the present disclosure. The system 100 can include a user computing device 102, a server computing system 130, and a training computing system 150 that in certain implementations can be communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more overall model(s) 120. For example, the overall model(s) 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example overall model(s) 120 can include one or more classifiers. For certain embodiments, the one or more overall model(s) 120 can be implemented on the user computing device 102 or on a server computing system 130. Additionally, the one or more overall models can be implemented as part of an active learning system 119 (e.g., Algorithm (I)) or may be called by the active learning system 119. Thus in some implementations the systems and devices described may include machine learned models as part of the overall model(s) 120 which are separate from the active learning system 119. In in other implementations one or more machine learned models may be implemented as part of the active learning system 119 and the overall model(s) 120 can in some instances be directed to other applications.

In some implementations, the one or more overall model(s) 120 can be received from the server computing system 130 over network 180, stored in the user computing device memory 114, and then used or otherwise implemented by the one or more processors 112. In some implementations, the user computing device 102 can implement multiple parallel instances of a single overall model(s) 120 (e.g., to perform parallel active learning across multiple instances of datasets and/or within the same dataset).

More particularly, the overall model(s) 120 can include an active learning algorithm such as Algorithm (I) that can include an exploit component and an explore component. In some implementations the exploit component can include a machine learning model for determining a classification score, such as a classifier. In some implementations the explore component can include a method for determining an exploration score. Additionally, the overall model(s) 120 can include a trade-off parameter p, which can be static, variable, or adjustable. In certain implementations, the overall model can iteratively update one or more of the individual components or parameters based in part on output from the overall model(s) 120.

Additionally or alternatively, one or more overall models 140 can be included in or otherwise stored and implemented by the server computing system 130 that communicates with the user computing device 102 according to a client-server relationship. For example, the overall models 140 can be implemented by the server computing system 130 as a portion of a web service. Thus, one or more model(s) 120 can be stored and implemented at the user computing device 102 and/or one or more models 140 can be stored and implemented at the server computing system 130. Additionally, the one or more overall models can be implemented as part of an active learning system 139 (e.g., Algorithm (I)) or may be called by the active learning system 139. Thus in some implementations the systems and devices described may include machine learned models as part of the overall models 140 which are separate from the active learning system 139. In other implementations one or more machine learned models may be implemented as part of the active learning system 139 and the overall model(s) 140 can in some instances be directed to other applications.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof As described above, the server computing system 130 can store or otherwise include one or more overall models 140 that can include a machine learning model. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the model(s) 120 and/or 140 via interaction with the training computing system 150 that is communicatively coupled over the network 180. The training computing system 150 can be separate from the server computing system 130 or can be a portion of the server computing system 130 and/or the user computing devices 102.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that can be used in some implementations to train the machine-learned models included in the overall model(s) 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the overall model(s) 120 and/or 140 based on a set of training data 162 which could include financial statements, emails, images, or text. In some cases, the training data can be vectorized by determining a number of features that describe the data and determining a value for each of the features for each datapoint in the training data 162. In certain implementations, the training data 162 can include both unlabeled and labeled datapoints.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried out via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 4 depicts a block diagram of an example computing device 50 that performs according to example embodiments of the present disclosure. The computing device can be a user computing device 102 or a server computing system 130 for implementing embodiments of the disclosure such as hybrid active learning methods.

The computing device includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 5 depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5, a respective machine-learned model (e.g., a model) can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 2A:
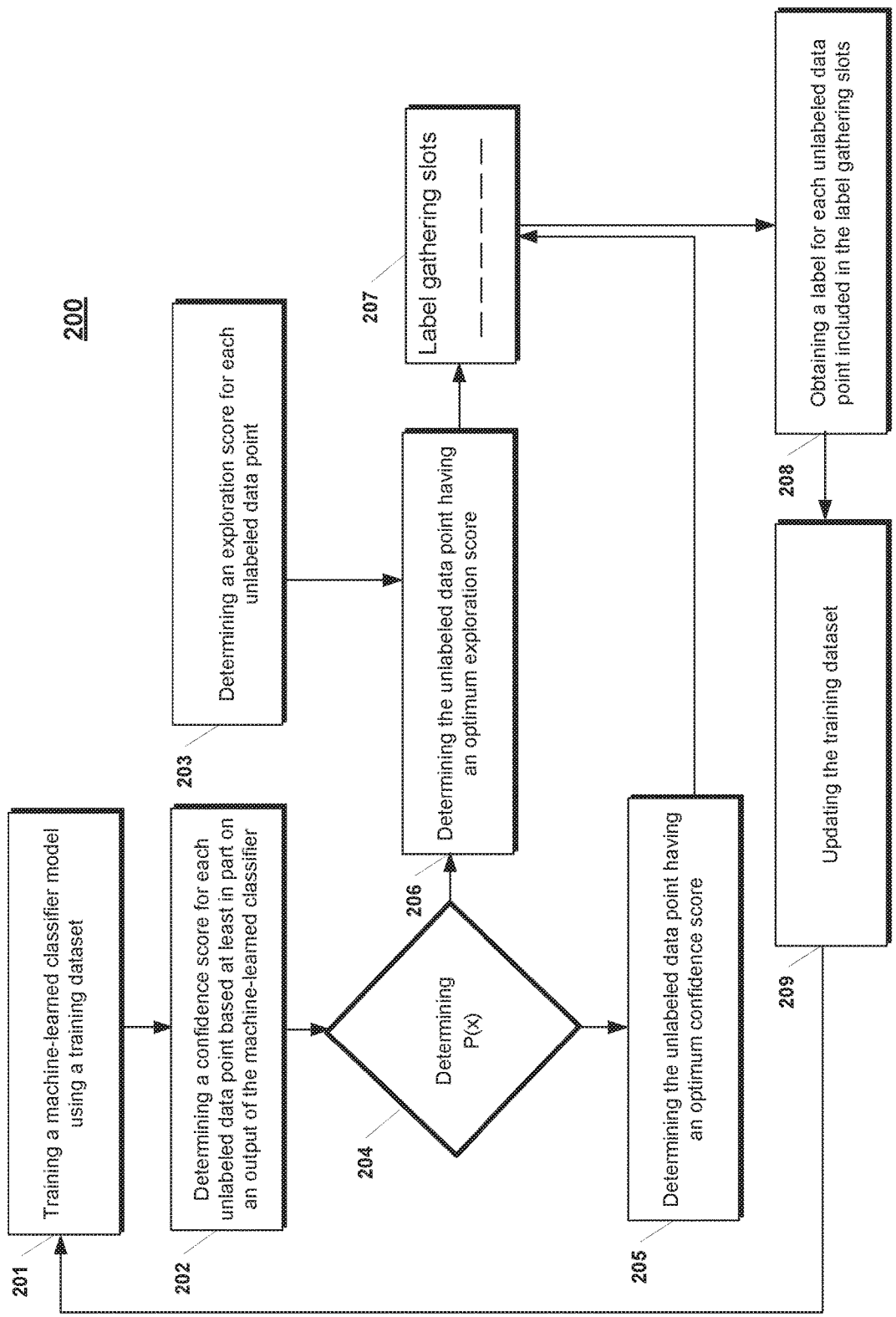
FIG. 2A depicts a flow chart diagram of an example method to perform hybrid active learning according to example embodiments of the present disclosure.

FIG. 2A depicts a flow chart diagram of an example method to perform according to example embodiments of the present disclosure. Although FIG. 2A depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 201, a computing system trains a machine-learned classifier model using a training dataset. The training dataset can include a plurality of labeled datapoints and a plurality of unlabeled datapoints that in some implementations have been preprocessed into a vectorized dataset.

At 202, the computing system determines a confidence score for each unlabeled datapoint based at least in part on an output of the machine-learned classifier. In some implementations the confidence score can be determined at least in part from confidence values output by a machine learned model, such as a trained classifier. As an example, the machine learned model can output a vector of probabilities associated with assigning the datapoint one or more labels, and a confidence score can be determined by calculating the absolute difference between the probabilities.

At 203, the computing system determines an exploration score for each unlabeled datapoint. As an example implementation, the exploration scores can be determined using information from the feature vectors that describe the dataset. For example, the exploration score can be determined for each unlabeled datapoint based at least in part on a respective distance between the unlabeled point and each of the labeled datapoints.

At 204, the computing system determines a probability parameter P(x). In some implementations, the probability parameter can be static. In some implementations, the probability parameter can be variable. In certain implementations, the probability parameter can be adaptive, such that the computing system adjusts the probability parameter based at least in part on output from a previous method iteration. Determining the probability parameter can trigger determining the unlabeled datapoint having an optimum confidence score 205 and/or determining the unlabeled datapoint having an optimum exploration score 206. In certain scenarios, the goal of the hybrid active learning algorithm can be improving the machine-learned classifier model. For these scenarios, determining 205 or 206 can be based in part on the unlabeled datapoints which display a greater uncertainty. In some scenarios, the goal of the hybrid active learning algorithm can be determining the unlabeled datapoints that are well characterized by the labeled datapoints, and so display less uncertainty. Generally, determining 205 or 206 can be based in part on the active learning application. Additionally, uncertainty can be calculated using a variety of methods (e.g., several non-limiting examples include: probability, distance, prior output, or any combinations thereof).

At 207, the computing system includes a number of label gathering slots which can be filled with unlabeled datapoints at each round based on the probability parameter 204. These label gathering slots represent an incremental allowance that can be selected at each overall iteration of the algorithm. While the figures show a set number of slots for the label gathering slots 207, this is not meant to indicate that the value must be static or constrained to the number shown in FIGS. 2A, 2B, 3A, and 3B. In fact, certain implementations may use a variable or adaptive number of label gathering slots.

At 208, the computing system obtains a label for each unlabeled datapoint included in the label gathering slots. In some implementations, obtaining a label can include providing the unlabeled datapoints selected for the label gathering slots to an expert and receiving the labeled datapoints that have been assigned a label by an expert. The labels obtained for each unlabeled datapoint can be used to update the training dataset 209 by removing the unlabeled datapoints selected for the label gathering slots 207 from the unlabeled datapoints and adding the labeled datapoints assigned a label by an expert to the labeled datapoints. The process 200 can be continued in an iterative manner by retraining the machine learned classifier 201 using the updated training dataset. Thus, in certain implementations the computing system can train the machine-learned classifier model using the updated trained dataset which includes the labels obtained at a prior iteration of the process 200.

Figure 2B:
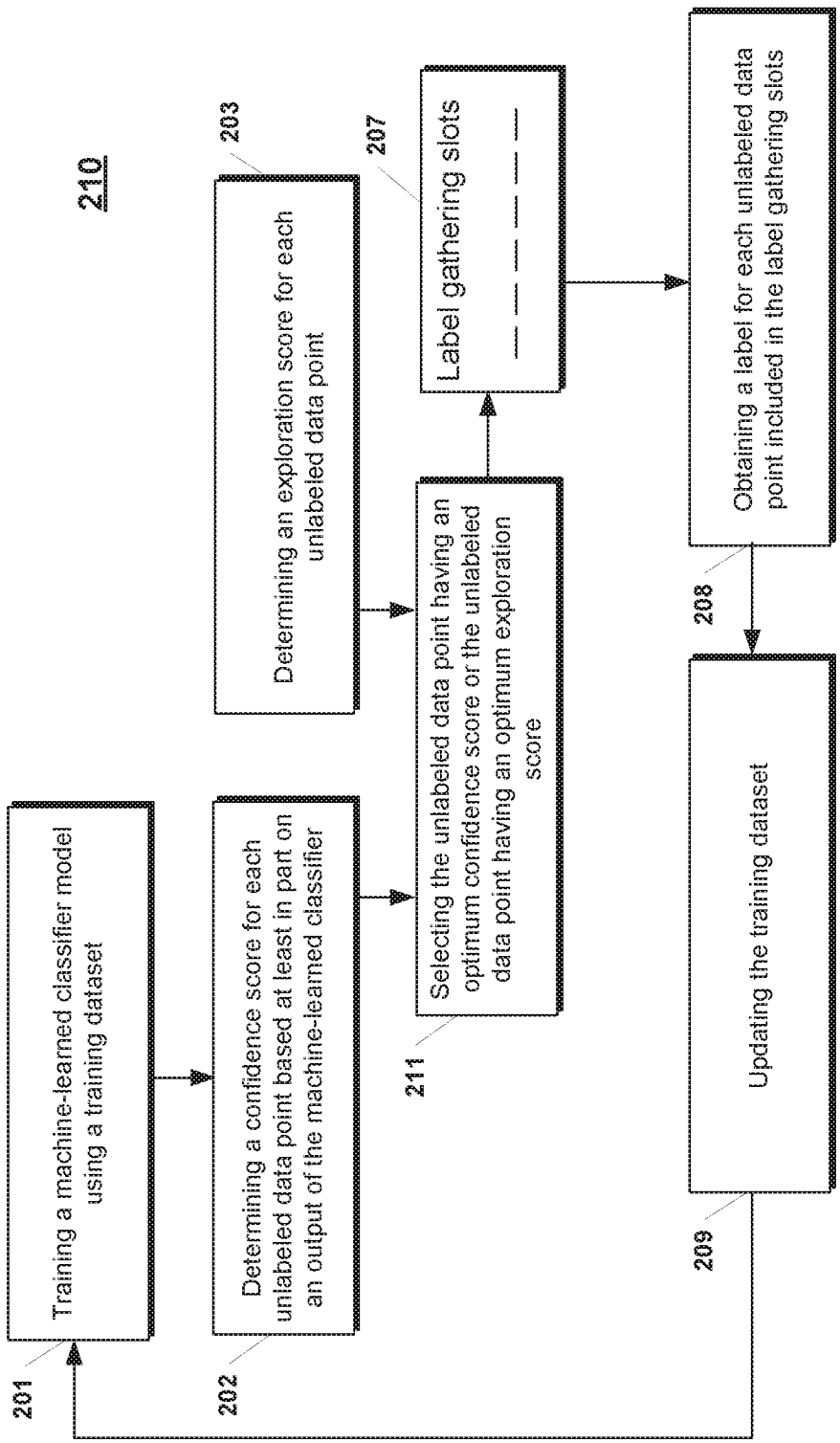
FIG. 2B depicts a flow chart diagram of an example method to perform hybrid active learning according to example embodiments of the present disclosure.

As shown in FIG. 2B, in some implementations, the operations 204, 205, and 206 can be condensed into a single step: selecting the unlabeled datapoint having an optimum confidence score or the unlabeled datapoint having the optimum exploration score 211. This process illustrates that the methods shown can be configured to optimize computational and/or algorithm performance by limiting or condensing operations. For example, operation 211, has two inputs, though in some implementations, only one input may be required (i.e., 202 or 203). Thus, certain embodiments may utilize the probability parameter to reduce computations thereby improving performance by determining a data selection strategy (e.g., exploitation or exploration) before determining the exploration scores or the confidence scores.

Example Arrangements

Figure 3A:
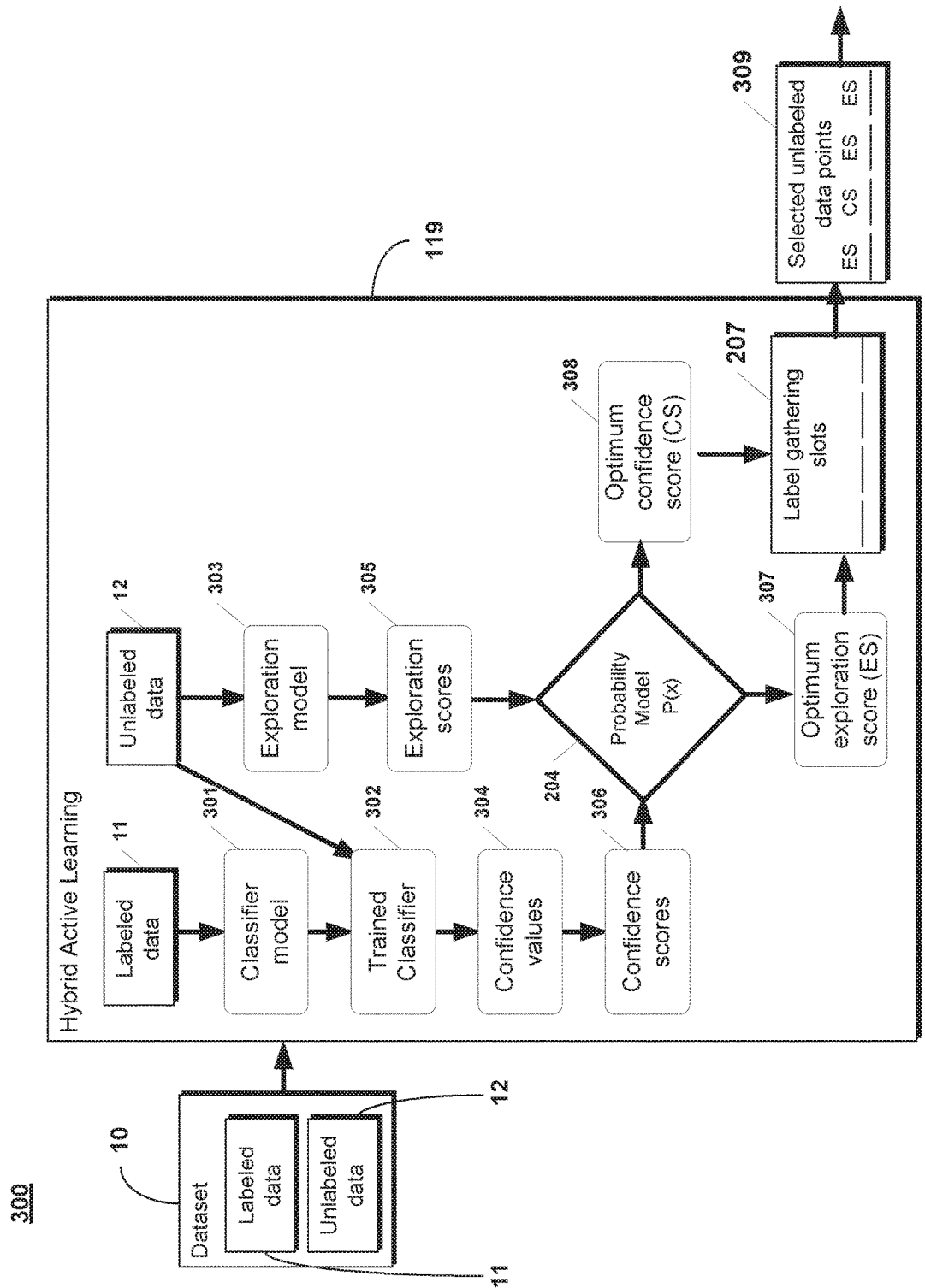
FIG. 3A depicts an example process executed by a computing device running an example hybrid active learning system as described in embodiments of the present disclosure.
Figure 3B:
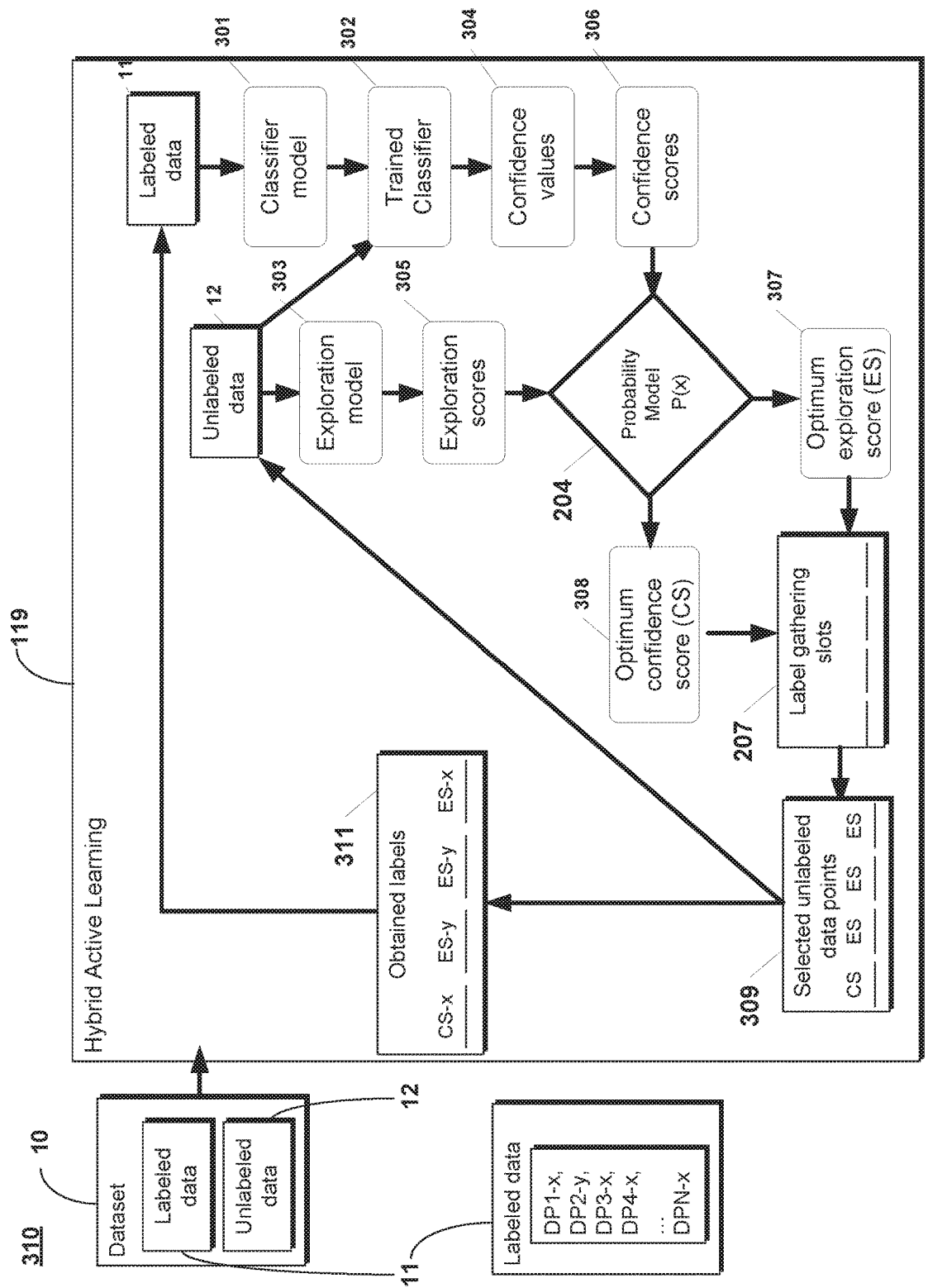
FIG. 3B depicts an example process executed by a computing device running an example hybrid active learning system as described in embodiments of the present disclosure.

As shown in FIGS. 3A and 3B, processes for implementing an active learning system 119 model or computer readable media (CRM) having an active learning system 119 can include multiple arrangements. In process 300, the hybrid active learning system 119 receives a dataset 10 including labeled data 11 and unlabeled data 12. The labeled data and unlabeled data can be processed in parallel or in sequence based on the application and not all steps of the hybrid active learning system 119 need to be executed. In this implementation, the labeled data is fed to a classifier model 301 to produce a trained classifier 302. The trained classifier can take unlabeled data 12 and determine confidence values 304 for each of the unlabeled datapoints. In parallel or in series, the unlabeled data can be processed by an exploration model 303 that can determine exploration scores 305 for each of the unlabeled datapoints. A probability model P(x) 204 having an adjustable probability parameter can be used to determine whether to select the optimum exploration score 307 and/or the optimum confidence score 308. Based on the probability model 204, an unlabeled datapoint is added to one slot of the label gathering slots 207. This process can be continued until each slot of the label gathering slots 207 is occupied to produce the selected unlabeled datapoints 309.

In process 310, an example is shown using binary classification having an x-label and a y-label, though other processes could be extended to a greater number of labels. The process 310 uses the x-label and the y-label as generic placeholders to represent two labels (e.g., spam and not spam).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing active learning on a training dataset that comprises a plurality of unlabeled datapoints and a plurality of labeled datapoints, the method comprising:

for each of one or more training iterations:

training, by one or more computing devices, a machine-learned classifier model using at least a portion of the plurality of labeled datapoints;

determining, by the one or more computing devices, a confidence score for each unlabeled datapoint based at least in part on one or more confidence values output by the machine-learned classifier model;

determining, by the one or more computing devices, an exploration score for each unlabeled datapoint;

for each of one or more label gathering slots:

selecting, by the one or more computing devices and according to a probability parameter, an unlabeled datapoint for inclusion in one of the label gathering slots based on the confidence scores or based on the exploration scores; and obtaining, by the one or more computing devices, a respective label for each unlabeled datapoint included in the label gathering slots to transform the unlabeled datapoints included in the label gathering slots into labeled datapoints.

2. The method of claim 1, wherein selecting, by the one or more computing devices and according to the probability parameter, the unlabeled datapoint having an optimum confidence score or the unlabeled datapoint having an optimum exploration score for inclusion in one of the label gathering slots comprises:

determining, by the one or more computing devices and according to the probability parameter, whether to select one of the unlabeled datapoints for inclusion in the label gathering slot based on the confidence scores or based on the exploration scores;

in response to a determination to select one of the unlabeled datapoints based on the confidence scores, selecting, by the one or more computing devices, one of the unlabeled datapoints for inclusion in the label gathering slot based on the confidence scores associated with the unlabeled datapoints; and in response to a determination to select one of the unlabeled datapoints based on the exploration scores, selecting, by the one or more computing devices, one of the unlabeled datapoints for inclusion in the label gathering slot based on the exploration scores associated with the unlabeled datapoints.

3. The method of claim 1, wherein determining, by the one or more computing devices, the exploration score for each unlabeled datapoint comprises: generating, by the one or more computing devices, a random number for each unlabeled datapoint.

4. The method of claim 1, wherein determining, by the one or more computing devices, the exploration score for each unlabeled datapoint comprises: determining, by the one or more computing devices, the exploration score for each unlabeled datapoint based at least in part on a respective distance between the unlabeled datapoint and each of the labeled datapoints.

5. The method claim 1, wherein determining, by the one or more computing devices, the exploration score for each unlabeled datapoint comprises:

assigning, by the one or more computing devices, each unlabeled datapoint a neighborhood, wherein the neighborhood defines a subset of the unlabeled datapoints and a subset of the labeled datapoints; and determining, by the one or more computing devices, the exploration score for each unlabeled datapoint based at least in part on a ratio of a number of labeled datapoints included in the neighborhood to a number of total datapoints included in the neighborhood.

6. The method of claim 1, wherein the machine-learned classifier model is configured to determine whether an input training example exhibits a first property associated with a first label, wherein the training dataset comprises a first subset of training examples that exhibit the first property associated with the first label and a second subset of training examples that exhibit a second property associated with a second label, and wherein the training dataset is skewed such that a number of training examples included in the first subset of training examples is less than a number of training examples included in the second subset of training examples.

7. The method of claim 1, wherein the confidence value for each unlabeled datapoint comprises a probability for associating the unlabeled datapoint to a label.

8. The method of claim 1, wherein selecting, by the one or more computing devices, the unlabeled datapoint based on the confidence scores comprises performing, by the one or more computing devices, an active learning technique selected from the group consisting of: margin sampling, query-by-committee, expected model change, expected error reducing, variance reduction, and combinations thereof.

9. The method of claim 1, wherein the probability parameter comprises a fixed value.

10. The method of claim 1, wherein the probability parameter comprises an adaptive probability parameter.

11. The method of claim 10, further comprising, for each of the one or more training iterations, adjusting, by the one or more computing devices, the probability parameter based at least in part on the confidence scores, the exploration scores, or a combination thereof.

12. The method of claim 10, further comprising, for each of the one or more training iterations, adjusting, by the one or more computing devices, the probability parameter based at least in part on a performance of the trained machine-learned classifier model.

13. The method of claim 12, wherein adjusting, by the one or more computing devices, the probability parameter based at least in part on the performance of the trained machine-learned classifier model comprises
    determining, by the one or more computing devices, a change in performance relative to a previous iteration; and
    adjusting, by the one or more computing devices, the probability parameter based at least in part on the change in performance relative to the previous iteration.

14. The method of claim 1, further comprising:
    updating, by the one or more computing devices, the training dataset based at least in part on the unlabeled datapoints included in the label gathering slots,
    wherein, updating the training dataset comprises:
        removing the unlabeled datapoints included in the label gathering slots from the plurality of unlabeled datapoints and
        adding the transformed unlabeled datapoints to the plurality of labeled datapoints, and wherein each transformed unlabeled datapoint includes the respective label.

15. The method of claim 1, wherein the training dataset comprises emails, and wherein obtaining, by the one or more computing devices, the respective label for each unlabeled datapoint included in the label gathering slots comprises obtaining, by the one or more computing devices, the respective label for each unlabeled datapoint included in the label gathering slots that indicates whether the unlabeled datapoint comprises an email that exhibits a characteristic selected from the group consisting of: spam, bill reminder, appointment, or correspondence.

16. The method of claim 1, wherein the training dataset comprises images or text, and wherein obtaining, by the one or more computing devices, the respective label for each unlabeled datapoint included in the label gathering slots comprises obtaining, by the one or more computing devices, the respective label for each unlabeled datapoint included in the label gathering slots that indicates whether the unlabeled datapoint comprises obscene content.

17. The method of claim 1, wherein the training dataset comprises transaction information, customer history, or a combination thereof; and wherein obtaining, by the one or more computing devices, the respective label for each unlabeled datapoint included in the label gathering slots comprises obtaining, by the one or more computing devices, the respective label for each unlabeled datapoint included in the label gathering slots that indicates whether the unlabeled training example exhibits fraudulent activity.

18. A computing system configured to perform active learning on a training dataset that comprises a plurality of unlabeled datapoints and a plurality of labeled datapoints, wherein each labeled datapoint includes one label from an identifier group comprising a plurality of at least two labels, the computing system comprising:
    one or more processors; and
    one or more non-transitory computer-readable media that collectively store instructions that, when executed by the one or more processors cause the computing system to perform operations, the operations comprising:
        training a machine-learned classifier model using the plurality of labeled datapoints;
        determining a confidence score for each of the unlabeled datapoints based at least in part on one or more confidence values output by the machine-learned classifier model for assigning each of the unlabeled datapoints one of the labels from the plurality of labels;
        determining an exploration score for each unlabeled datapoint;
        identifying the unlabeled datapoint having a minimum confidence score and the unlabeled datapoint having a minimum exploration score;
        selecting, according to a probability parameter, the unlabeled datapoint having the minimum confidence score or the unlabeled datapoint having the minimum exploration score for inclusion in a slot; and
        assigning the unlabeled datapoint included in the slot a label from the identifier group.

19. The computing system of claim 18, wherein the identifier group includes an x-label and a y-label and wherein,
    determining a confidence score for each of the unlabeled datapoints is based at least in part on one or more confidence values output by the machine-learned classifier model for assigning each of the unlabeled datapoints the x-label or the y-label.

20. One or more non-transitory computer-readable media that store instructions that, when executed by one or more processors, cause the one or more processors to perform operations, the operations comprising:
    for each of one or more training iterations:
        training a machine-learned classifier model using at least a portion of a plurality of labeled datapoints;
        determining a confidence score for each unlabeled datapoint of a plurality of unlabeled datapoints based at least in part on one or more confidence values output by the machine-learned classifier model respectively for one or more classification labels assigned to the unlabeled datapoint by the machine-learned classifier model;

determining an exploration score for each unlabeled datapoint;

for each of a number of label gathering slots:
- determining, according to a probability parameter, whether to select one of the unlabeled datapoints for inclusion in the label gathering slot based on the confidence scores or based on the exploration scores;
- in response to a determination to select one of the unlabeled datapoints based on the confidence scores, selecting one of the unlabeled datapoints for inclusion in the label gathering slot based on the confidence scores associated with the unlabeled datapoints; and
- in response to a determination to select one of the unlabeled datapoints based on the exploration scores, selecting one of the unlabeled datapoints for inclusion in the label gathering slot based on the exploration scores associated with the unlabeled datapoints; and obtaining a respective label for each unlabeled datapoint included in the number of label gathering slots to transform the unlabeled datapoints included in the number of label gathering slots into labeled datapoints.

* * * * *